United States Patent
Meyer Timmerman Thijssen et al.

(10) Patent No.: US 10,234,630 B2
(45) Date of Patent: Mar. 19, 2019

(54) METHOD FOR CREATING A HIGH REFRACTIVE INDEX WAVE GUIDE

(71) Applicant: Applied Materials, Inc., Santa Clara, CA (US)

(72) Inventors: Rutger Meyer Timmerman Thijssen, Sunnyvale, CA (US); Steven Verhaverbeke, San Francisco, CA (US); Joseph R. Johnson, Redwood City, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/647,348

(22) Filed: Jul. 12, 2017

(65) Prior Publication Data

US 2019/0018189 A1    Jan. 17, 2019

(51) Int. Cl.
   *G02B 6/10*     (2006.01)
   *G02B 6/122*    (2006.01)
   *G02B 6/136*    (2006.01)
   *G02B 6/12*     (2006.01)

(52) U.S. Cl.
   CPC .......... *G02B 6/1223* (2013.01); *G02B 6/136* (2013.01); *G02B 2006/12038* (2013.01); *G02B 2006/12176* (2013.01)

(58) Field of Classification Search
   CPC ............. G02B 6/1223; G02B 6/136; G02B 2006/12176; G02B 2006/12038
   See application file for complete search history.

(56) References Cited

U.S. PATENT DOCUMENTS

| | | | | |
|---|---|---|---|---|
| 5,114,513 A | * | 5/1992 | Hosokawa | ............... G02B 3/08 156/150 |
| 5,858,051 A | | 1/1999 | Komiyama et al. | |
| 5,879,756 A | | 3/1999 | Fathi et al. | |
| 6,150,286 A | | 11/2000 | Sun et al. | |
| 6,242,368 B1 | | 6/2001 | Holmer et al. | |
| 6,251,751 B1 | | 6/2001 | Chu et al. | |
| 6,500,603 B1 | * | 12/2002 | Shioda | ................... G02B 6/138 264/1.24 |
| 7,460,760 B2 | | 12/2008 | Cho et al. | |

(Continued)

FOREIGN PATENT DOCUMENTS

| | | |
|---|---|---|
| JP | 2013516788 A | 5/2013 |
| JP | 2014019912 A | 2/2014 |

(Continued)

OTHER PUBLICATIONS https://scientificpolymer.com/technical-library/refractive-index-of-polymers-by-index.*

(Continued)

*Primary Examiner* — Ellen Kim
(74) *Attorney, Agent, or Firm* — Patterson + Sheridan LLP (57) ABSTRACT

Embodiments described herein generally relate to a wave guide and a method of creating a wave guide. In one embodiment, a method of forming a wave guide is disclosed herein. An inverse master substrate having a plurality of projections extending therefrom is formed. A high refractive index material is formed on a top surface of the inverse master substrate. A glass layer is positioned on a top surface of the high refractive index material. The inverse master substrate is removed from the high refractive index material.

20 Claims, 5 Drawing Sheets

(56) References Cited

U.S. PATENT DOCUMENTS

| | | |
|---|---|---|
| 7,503,334 B1 | 3/2009 | Shrinivasan et al. |
| 7,521,378 B2 | 4/2009 | Fucsko et al. |
| 7,867,923 B2 | 1/2011 | Mallick et al. |
| 8,027,089 B2 | 9/2011 | Hayashi |
| 8,318,584 B2 | 11/2012 | Li et al. |
| 8,349,085 B2 | 1/2013 | Tahara et al. |
| 8,449,942 B2 | 5/2013 | Liang et al. |
| 8,481,123 B2 | 7/2013 | Kim et al. |
| 8,557,712 B1 | 10/2013 | Antonelli et al. |
| 8,741,788 B2 | 6/2014 | Liang et al. |
| 8,936,834 B2 | 1/2015 | Kim et al. |
| 9,257,314 B1 | 2/2016 | Rivera et al. |
| 9,306,026 B2 | 4/2016 | Toriumi et al. |
| 9,484,406 B1 | 11/2016 | Sun et al. |
| 2001/0029108 A1 | 10/2001 | Tometsuka |
| 2002/0122885 A1 | 9/2002 | Ahn |
| 2002/0151128 A1 | 10/2002 | Lane et al. |
| 2003/0207593 A1 | 11/2003 | Derderian et al. |
| 2004/0060519 A1 | 4/2004 | Beauchaine et al. |
| 2004/0248392 A1 | 12/2004 | Narwankar et al. |
| 2005/0269291 A1 | 12/2005 | Kent |
| 2006/0226117 A1 | 10/2006 | Betram et al. |
| 2006/0279025 A1 | 12/2006 | Heidari et al. |
| 2006/0290017 A1* | 12/2006 | Yanagisawa ..... B29D 11/00875 264/1.27 |
| 2007/0187386 A1 | 8/2007 | Kim et al. |
| 2008/0074658 A1 | 3/2008 | Davis et al. |
| 2008/0210273 A1 | 9/2008 | Joe |
| 2009/0180847 A1 | 7/2009 | Guo et al. |
| 2009/0233449 A1 | 9/2009 | Lebouitz et al. |
| 2009/0243126 A1* | 10/2009 | Washiya ............. B29C 35/0888 264/2.5 |
| 2010/0006211 A1 | 1/2010 | Wolk et al. |
| 2010/0173495 A1 | 7/2010 | Thakur et al. |
| 2012/0175822 A1 | 7/2012 | Inamiya et al. |
| 2012/0285492 A1 | 11/2012 | Lee et al. |
| 2013/0330042 A1* | 12/2013 | Nara ....................... G02B 6/305 385/43 |
| 2013/0337171 A1 | 12/2013 | Sasagawa |
| 2014/0023320 A1* | 1/2014 | Lee .......................... G02B 6/26 385/39 |
| 2014/0076494 A1 | 3/2014 | Miyashita et al. |
| 2014/0138802 A1 | 5/2014 | Starostine et al. |
| 2014/0231384 A1 | 8/2014 | Underwood et al. |
| 2014/0284821 A1 | 9/2014 | Hubbard |
| 2015/0159272 A1 | 6/2015 | Yoon et al. |
| 2015/0309073 A1* | 10/2015 | Mirkin ................... B82Y 40/00 850/55 |
| 2015/0322286 A1 | 11/2015 | Cabrini et al. |
| 2016/0076149 A1 | 3/2016 | Yamazaki et al. |
| 2016/0118391 A1 | 4/2016 | Zhao et al. |
| 2016/0353522 A1 | 12/2016 | Rathi et al. |
| 2017/0011932 A1 | 1/2017 | Pethe et al. |
| 2017/0104062 A1 | 4/2017 | Bi et al. |
| 2017/0140996 A1 | 5/2017 | Lin et al. |
| 2017/0160012 A1 | 6/2017 | Kobayashi et al. |
| 2017/0194430 A1 | 7/2017 | Wood et al. |
| 2018/0019249 A1* | 1/2018 | Zhang ............... H01L 27/11521 |

FOREIGN PATENT DOCUMENTS

| | | |
|---|---|---|
| KR | 20070075383 A | 7/2007 |
| KR | 1020090040867 A | 4/2009 |
| KR | 20140003776 A | 1/2014 |
| KR | 20150122432 A | 11/2015 |

OTHER PUBLICATIONS

International Search Report and Written Opinion dated Nov. 30, 2018 for Application No. PCT/US2018/041688.

International Search Report and Written Opinion for PCT/US2018/021715 dated Jun. 22, 2018.

International Search Report and Written Opinion from PCT/US2018/034036 dated Aug. 24, 2018.

International Search Report and Written Opinion dated Aug. 24, 2018 for Application No. PCT/US2018/034284.

International Search Report, Application No. PCT/US2018/028258 dated Aug. 9, 2018.

International Search Report and Written Opinion for PCT/US2018/035210 dated Aug. 24, 2018.

International Search Report and Written Opinion for PCT/US2018/038822 (APPM/24681PC) dated Oct. 26, 2018.

* cited by examiner

METHOD FOR CREATING A HIGH REFRACTIVE INDEX WAVE GUIDE

BACKGROUND

Field

Embodiments of the present disclosure generally relates to a method and apparatus for patterning substrates. More specifically, embodiments of the present disclosure relate to a method of creating a wave guide for patterning a substrate.

Description of the Related Art

Photolithography is widely used in the manufacturing of semiconductor devices and display devices, such as liquid crystal displays (LCDs). Large area substrates are often utilized in the manufacture of LCDs. LCDs, or flat panels, are commonly used for active matrix displays, such as computers, touch panel devices, personal digital assistants (PDAs), cell phones, television monitors, and the like. Generally, flat panels may include a layer of liquid crystal material forming pixels sandwiched between two plates. When power from the power supply is applied across the liquid crystal material, an amount of light passing through the liquid crystal material may be controlled at pixel locations enabling images to be generated.

Pattern transfer by physical contact is a technique used for patterning substrates, including large area substrates. A wave guide is developed, and then physically applied to the substrate. The wave guide allows light to enter and exit the optical glass/material.

As the foregoing illustrates, there is a continual need for an improved technique for precisely and cost-effectively creating patterns on a substrate.

SUMMARY

Embodiments described herein generally relate to a wave guide and a method of creating a wave guide. In one embodiment, a method of forming a wave guide is disclosed herein. An inverse master substrate having a plurality of projections extending therefrom is formed. A high refractive index material is formed on a top surface of the inverse master substrate. A glass layer is positioned on a top surface of the high refractive index material. The inverse master substrate is selectively removed from the high refractive index material.

In another embodiment, a method of forming a wave guide is disclosed herein. An inverse daughter substrate having a pattern of a plurality of projections extending therefrom is formed. The formation of the inverse daughter substrate includes forming an inverse master substrate having a pattern of a plurality of projections extending therefrom. The pattern of the inverse master is substantially equivalent to the pattern of the inverse daughter substrate. A high refractive index material is formed on a top surface of the inverse daughter substrate. A glass layer is positioned on a top surface of the high refractive index material. The inverse daughter substrate is selectively removed from the high refractive index material.

In another embodiment, a wave guide is disclosed herein. The wave guide includes a glass layer and a material. The glass layer has a refractive index of at least 1.4. The material is formed on a top surface of the glass layer. The material has a refractive index of at least 1.5. The material has a pattern etched therein.

DETAILED DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
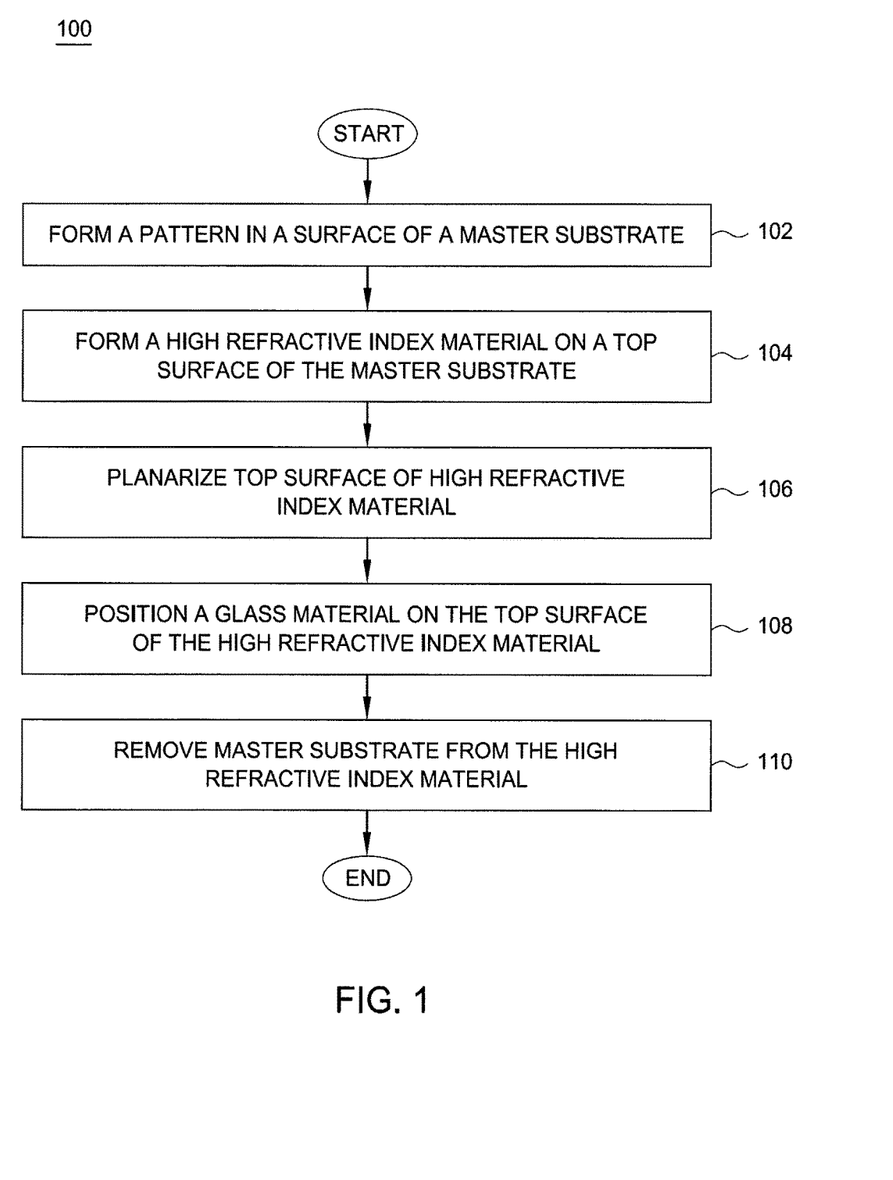
FIG. 1 illustrates a method of forming a waveguide, according to one embodiment.

FIG. 1 is a flow diagram that illustrates one embodiment of a method 100 for forming a wave guide, according to one embodiment. FIGS. 2A-2E illustrate cross sectional views of a waveguide during different stages of the method 100, according to one embodiment.

Figures 2A, 2B:
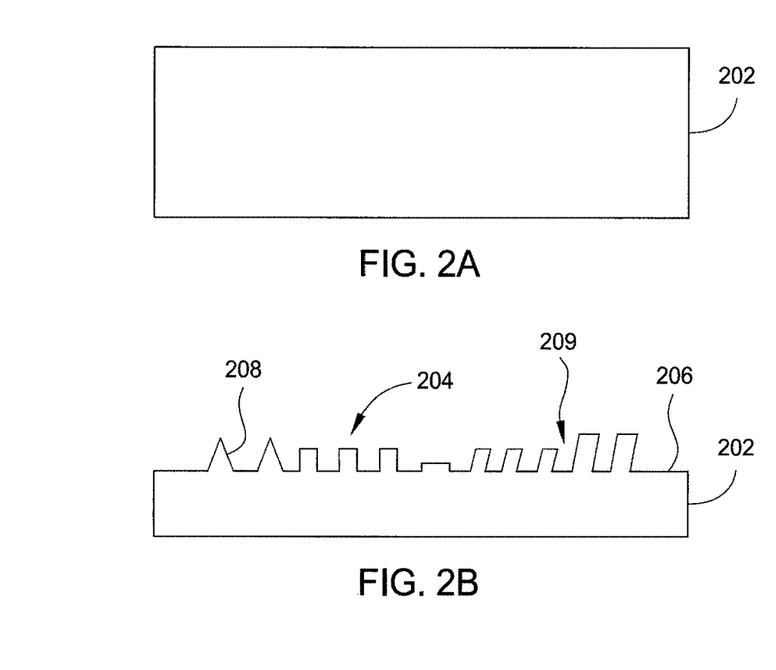
FIGS. 2A-2E illustrate side cross sectional views of a waveguide at different stages of the method of FIG. 1, according to one embodiment.

FIG. 2A illustrates a cross-sectional view of a master substrate 202, according to one embodiment. In one embodiment, the master substrate 202 may be formed from a silicon material. At block 102, a patter 204 is formed on a surface thereof. In the embodiment shown, the master substrate 202 has the pattern 204 formed in a top surface 206 of the master substrate 202, as shown in FIG. 2B. The pattern 204 may be etched into the master substrate 202 using an etch process. For example, the pattern 204 may be etched into the master substrate 202 using an etch process that may produce a non-vertical trench and/or extrusions extending therefrom. The etch process forms the pattern 204 in the master substrate 202 such that an inverse master substrate 202 is formed. The inverse master substrate 202 is such that the master substrate 202 includes a plurality of projections 208 protruding from the master substrate 202 and trenches 209 extending into the master substrate 202.

Figure 2C:
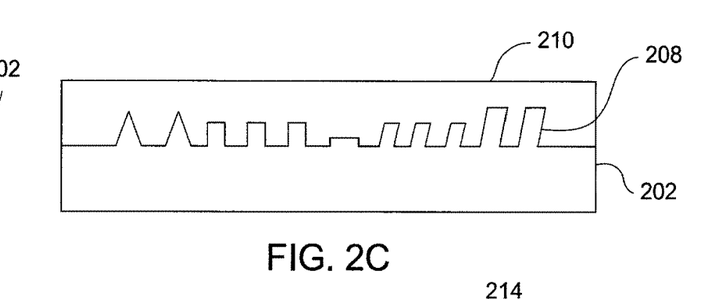

At block 104, a material 210 is formed on a top surface of the master substrate 202, as shown in FIG. 2C. For example, a high refractive index (high-n) material is grown on the top surface 206 of the master substrate 202. In another embodiment, a high refractive index (high-n) material is conformally deposited on the top surface 206 of the master substrate 202. In some embodiments, the high-n material may be formed from an oxide, such as, for example, $MoO_3$, $TiO_2$, SiO, SiON, and the like. Generally, the material index may have a refractive index of greater than 1.55. In some embodiment, the material 210 may have an index substantially equal to that of glass (i.e. n≈1.4-1.8). In other embodiment, the material 210 may have a refractive index substantially greater than glass (i.e., n>1.7).

At block 106, the master substrate 202 may, optionally, undergo a chemical mechanical polishing (CMP) process. For example, the master substrate 202 may undergo a CMP process to planarize a top surface 212 of the material 210. Planarizing the top surface 212 of the material 210 may allow for a more robust bonding to other components of the waveguide.

Figure 2D:
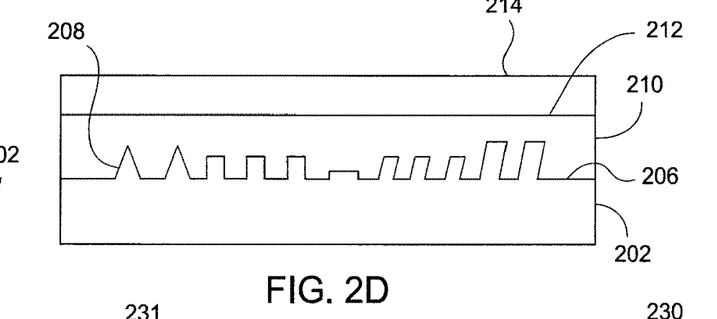

At block 108, a glass material 214 may be positioned on the top surface 212 of the material 210. For example, in one embodiment, the glass material 214 may be bonded to the top surface 212 of the material 210. In another embodiment, the glass material 214 may be spun on the top surface 212 of the material 210. Generally, in conventional approaches to creating wave guide, refractive index matching between the glass material 214 and the material 210 is unattainable due to conventional approaches that use a soft resin-like material as a stamp material. By utilizing the master substrate 202 rather than a soft resin-like stamp material, the current approach is able to achieve a refractive index of the material 210 approaching, matching, and exceeding that of the glass material 214.

Figure 2E:
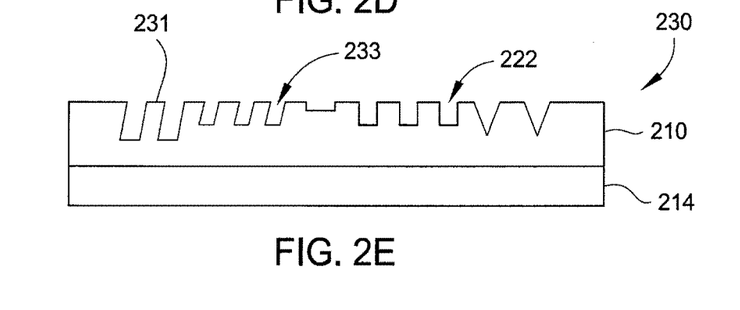

At block 110, the master substrate 202 is removed from the material 210. In one embodiment, the master substrate 202 may be removed from the material 210 through a wet etch process. For example, the master substrate 202 may be removed from the material 210 using KOH to selectively etch away silicon comprising the master substrate 202 from the material 210. In another example, the master substrate 202 may be removed from the material 210 using a dry etch process.

After removal of the master substrate 202, a wave guide 230 remains. The wave guide 230 includes the glass material 214 with the material 210 deposited thereon. The material 210 includes a pattern 222 formed therein as a result of the projections 208 and trenches 209 of the inverse master substrate 202. Accordingly, the wave guide 230 includes a high refractive index material 210, which was previously unobtainable using conventional methods. The pattern 222 includes projections 231 formed between the projections 208 of the inverse master substrate 202. When the projections 208 are removed, trenches 233 are left between the projections 231. Accordingly, the pattern 222 is complementary to the pattern 204.

Figure 3:
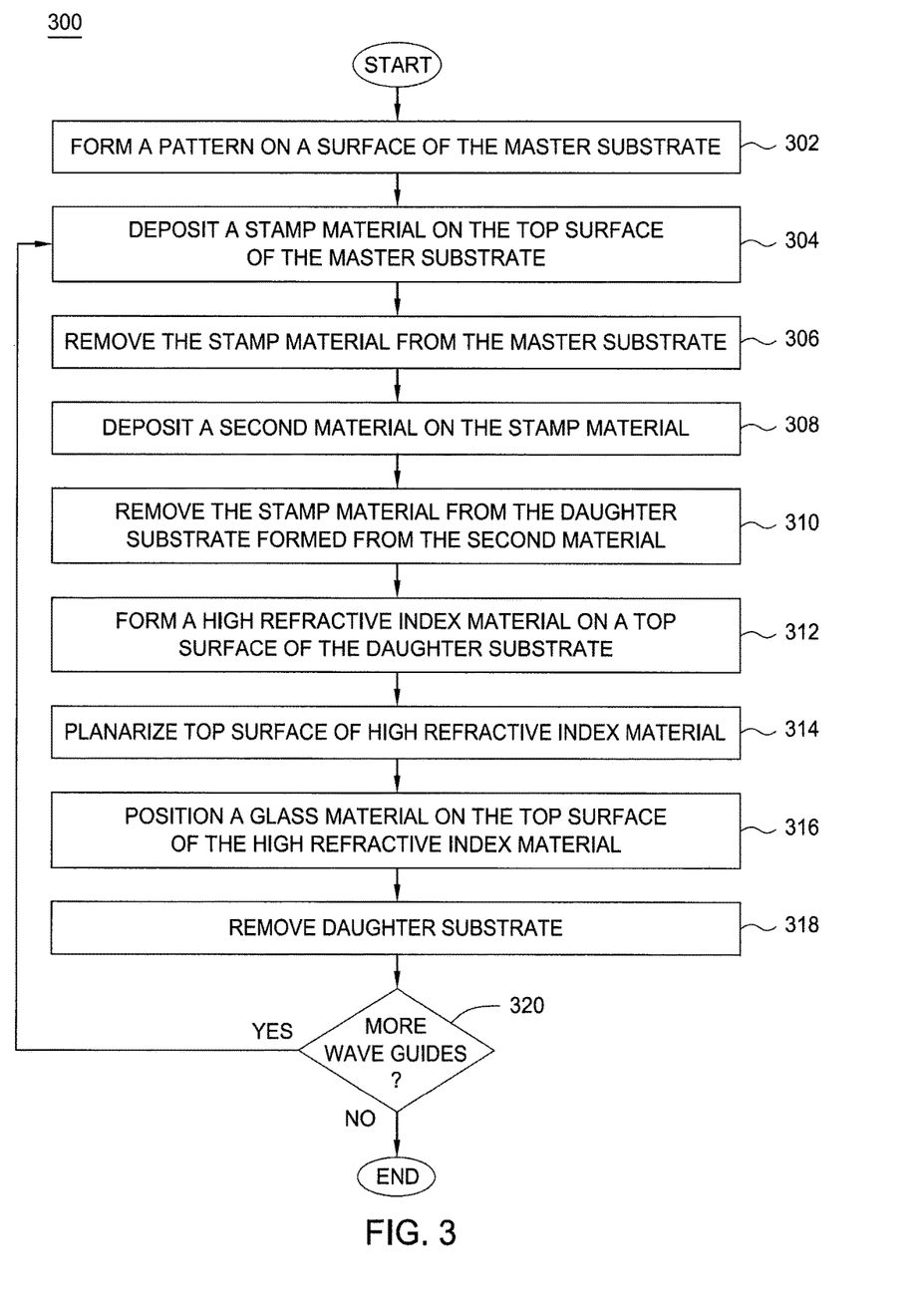
FIG. 3 illustrates a method of forming a waveguide, according to one embodiment.

FIG. 3 is a flow diagram that illustrates one embodiment of a method 300 for forming a wave guide, according to one embodiment. FIGS. 4A-4I illustrate cross sectional views of a waveguide, according to one embodiment.

Figure 4:
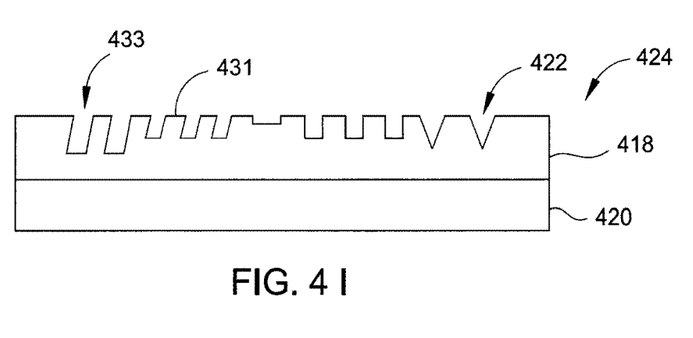
FIGS. 4A-4I illustrate side cross sectional views of a waveguide at different stages of the method of FIG. 3, according to one embodiment.
Figure 4A:
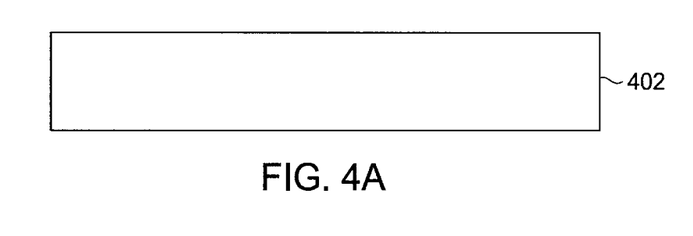
Figure 4B:
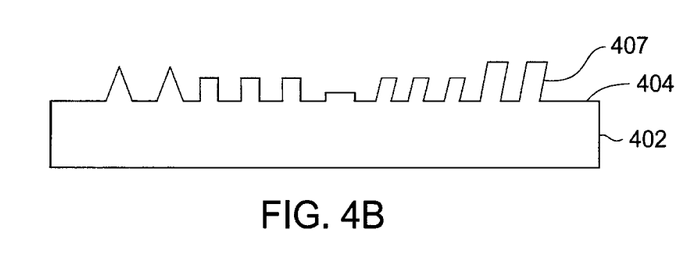

FIG. 4A illustrates a cross-sectional view of a master substrate 402, according to one embodiment. The master substrate 402 may be formed from a silicon material. At block 302, a pattern 406 is formed on a surface of the master substrate 402, as illustrated in FIG. 4B. In the embodiment shown, the master substrate 402 has the pattern 406 formed in a top surface 404 of the master substrate 402. The pattern 406 may be etched into the master substrate 402 using an etch process. The etch process forms the patter 406 in the master substrate 402 such that an inverse master substrate is formed. The inverse master substrate 402 is such that the master substrate 402 includes a plurality of projections 407 protruding from the master substrate 402.

Figure 4C:
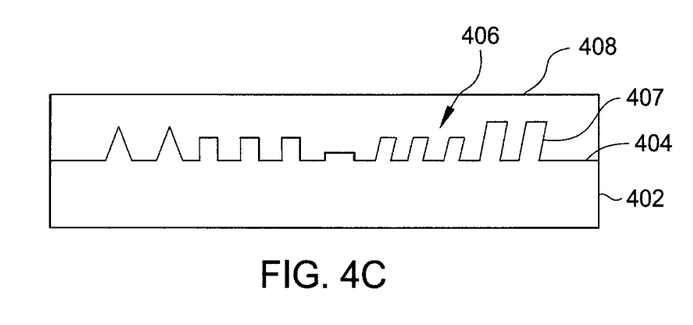
Figure 4D:
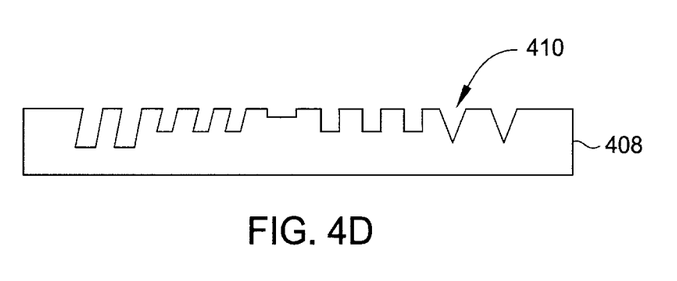

At block 304, a stamp material 408 is deposited on the top surface 404 of the master substrate 402, as shown in FIG. 4C. For example, in one embodiment the stamp material 408 may be a soft material, such as silicone. At block 306, the stamp material 408 is removed from the master substrate 402, as shown in FIG. 4D. The stamp material 408 is removed from the master substrate 402, while keeping the structure of the master substrate 402 in place for subsequent use. A reverse pattern 410 is formed in the stamp material 408 as a result of the projections 407 of the master substrate 402.

Figure 4E:
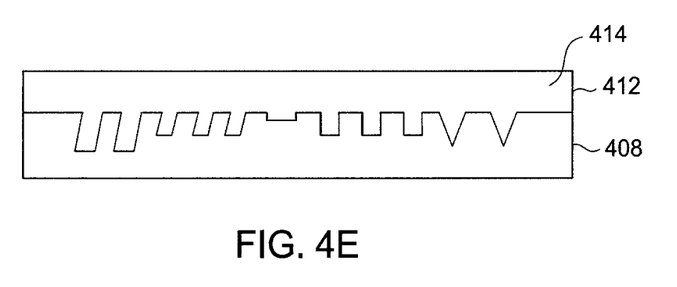

At block 308, a second material is deposited on the stamp material 408, as shown in FIG. 4E. For example, the second material is deposited on the top surface 412 of the stamp material 408, and into the reverse pattern 410 formed in the second material. Such deposition creates a daughter substrate 414, which may be subsequently used to create a wave guide. In one embodiment, the second material may be a silicon based material, such as SiO2, SiN, C, or the like. Generally, the second material may be any material that may be grown, spun onto, or deposited onto the stamp material 408, be rigid enough to act as a mold, be a scaffold for the high index material to be grown/deposited, and be able to be selectively etched away with respect to a high index material.

Figure 4F:
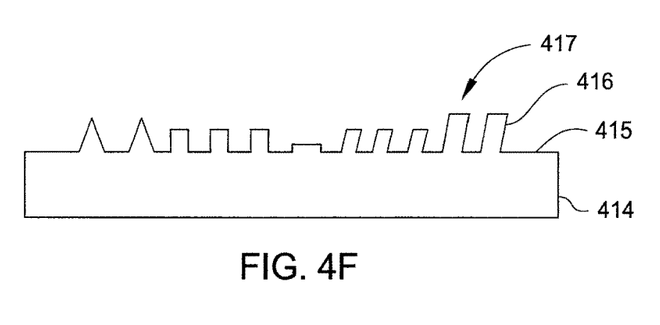

At block 310, the stamp material 408 is removed from the daughter substrate 414, as shown in FIG. 4F. Removal of the stamp material 408 from the daughter substrate 414 exposes an inverse pattern 417 of projections 416 extending from a top surface 415 of the daughter substrate 414. The inverse pattern 417 is equivalent to the pattern 406 in the master substrate 402. Accordingly, the daughter substrate 414 is a disposable version of the master substrate 402, while the master substrate 402 may be repeatedly used to create subsequent daughter substrates.

Figure 4G:
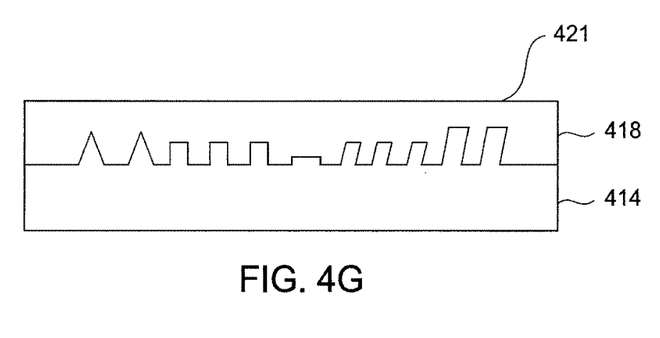

At block 312, a material 418 is formed on a top surface of the daughter substrate 414, as shown in FIG. 4G. For example, a high refractive index (high-n) material is grown on the top surface 415 of the daughter substrate 414. In another example, a high refractive index (high-n) material is conformally deposited on the top surface 415 of the daughter substrate 414. In some embodiments, the high-n material may be formed from an oxide, such as, for example, $MoO_3$, $TiO_2$, SiO, SiON, and the like. Generally, the material 418 index may have a refractive index of greater than 1.55. In some embodiments, the material 418 may have a refractive index substantially equal to that of glass (i.e. n≈1.4-1.8). In other embodiments, the material 418 may have a refractive index substantially greater than glass (i.e., n>1.7).

Figure 4H:
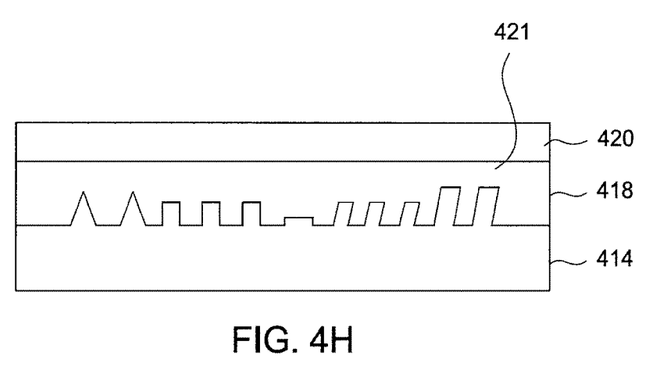

At block 314, the material 418 may, optionally, undergo a chemical mechanical polishing (CMP) process, as shown in FIG. 4H. For example, the daughter substrate 414 may undergo a CMP process to planarize a top surface 421 of the material 418. Planarizing the top surface 421 of the material 418 may allow for a more robust bonding to other components of the waveguide.

At block 316, a glass material 420 may be positioned on the top surface 421 of the material 418, as shown in FIG. 4H. For example, in one embodiment, the glass material 420 may be bonded to the top surface 421 of the material 418. In another embodiment, the glass material 420 may be spun on the top surface 421 of the material 418. Generally, in conventional approaches to creating wave guide, a refractive index matching between the glass material 420 and the material 418 is unattainable due to conventional approaches using a soft resin-like material as a stamp material. By utilizing the daughter substrate 414 rather than a soft resin-like stamp material, the current approach is able to achieve a refractive index of the material 418 approaching, matching, and exceeding that of the glass material 420.

At block 318, the daughter substrate 414 is removed from the material 418, as shown in FIG. 4I. In one embodiment, the daughter substrate 414 may be removed from the material 418 through a wet etch process. For example, the daughter substrate 414 may be removed from the material 418 using KOH to selectively etch away silicon comprising the daughter substrate 414 from the material 418. In another example, the daughter substrate 414 may be removed from the material 418 using a dry etch process.

After removal of the daughter substrate 414, a wave guide 424 remains. The wave guide 424 includes the glass material 420 with the material 418 deposited thereon. The material 418 includes a pattern 422 formed therein as a result of the projections 416 and trenches 419 of the daughter substrate 414. Accordingly, the wave guide 424 includes a high refractive index material 418, which was previously unobtainable using conventional methods. The patter 422 includes projections 431 formed between the projections 407 of the inverse master substrate 402. When the projections 416 are removed, trenches 433 are left between the projections 431. Accordingly, the pattern 422 is complementary to the pattern 417.

At decision 320, it is determined whether an additional wave guide may be made. If an additional wave guide is desired, the method 300 reverts to block 304 for creation of a subsequent daughter substrate. If, however, an additional wave guide is not desired, the method 300 ends.

While the foregoing is directed to embodiments of the present invention, other and further embodiments of the invention may be devised without departing from the basic scope thereof, and the scope thereof is determined by the claims that follow.

What is claimed is:

1. A method of forming a wave guide, comprising:
    forming an inverse substrate having a plurality of projections and trenches extending therefrom;
    forming a high refractive index material on a top surface of the inverse substrate, wherein the high refractive index material has a refractive index of at least 1.4; then
    positioning a glass layer on a top surface of the high refractive index material; and
    removing the inverse substrate from the high refractive index material.

2. The method of claim 1, wherein forming the inverse substrate, comprises:
    etching a silicon layer.

3. The method of claim 1, wherein the high refractive index material has a refractive index of at least 1.55 to about 1.8.

4. The method of claim 1, wherein the high refractive index material and the glass layer have substantially the same refractive index.

5. The method of claim 1, wherein removing the inverse substrate from the high refractive index material, comprises:
    performing a wet etch process on the inverse master substrate.

6. The method of claim 1, where removing the inverse substrate from the high refractive index material, comprises:
    performing a dry etch process on the inverse master substrate.

7. The method of claim 1, wherein forming the high refractive index material on a top surface of the inverse substrate, comprises:
    conformally depositing the high refractive index material on the top surface of the inverse substrate.

8. The method of claim 1, wherein forming the high refractive index material on a top surface of the inverse substrate, comprises:
    growing the high refractive index material on the top surface of the inverse substrate.

9. A method of forming a wave guide, comprising:
    forming an inverse daughter substrate having a pattern, formed on a surface thereof, of a plurality of projections and trenches, comprising:
        forming an inverse master substrate having a pattern, formed on a surface thereof, of a plurality of projections extending therefrom, wherein the pattern of the inverse master is substantially equal to the pattern of the inverse daughter substrate;
    forming a high refractive index material on a top surface of the inverse daughter substrate, wherein the high refractive index material has a refractive index of at least 1.4; then
    positioning a glass layer on a top surface of the high refractive index material; and
    removing the inverse daughter substrate from the high refractive index material, leaving another plurality of projections and trenches in the high refractive index material that is complementary to the plurality of projections and trenches of the inverse daughter substrate.

10. The method of claim 9, wherein forming an inverse daughter substrate having a pattern of a plurality of projections extending therefrom, further comprises:
    depositing a stamp material on a top surface of the inverse master substrate, forming a pattern in the stamp material;
    forming a layer on top of the stamp material, into the pattern formed in the stamp material; and
    removing the stamp material from the silicon layer to form the inverse daughter substrate.

11. The method of claim 9, wherein the high refractive index material has a refractive index of at least 1.55 to about 1.8.

12. The method of claim 9, wherein the high refractive index material and the glass layer have substantially the same refractive index.

13. The method of claim 9, wherein removing the inverse daughter substrate from the high refractive index material, comprises:
    performing a wet etch process on the inverse daughter substrate.

14. The method of claim 9, where removing the inverse daughter substrate from the high refractive index material, comprises:
    performing a dry etch process on the inverse daughter substrate.

15. The method of claim 9, wherein forming a high refractive index material on a top surface of the inverse daughter substrate, comprises:
    conformally depositing the high refractive index material on the top surface of the inverse daughter substrate.

16. The method of claim 9, wherein forming a high refractive index material on a top surface of the inverse daughter substrate, comprises:
    growing the high refractive index material on the top surface of the inverse daughter substrate.

17. The method of claim 9, further comprising:
    forming a second inverse daughter substrate having a second pattern of a second plurality of projections extending therefrom, comprising:

depositing a second stamp material on a second top surface of the inverse master substrate, forming a second pattern in the stamp material;

depositing a second layer on top of the second stamp material, into the second pattern formed in the second stamp material; and removing the second stamp material from the second layer to form the second inverse daughter substrate, wherein the second pattern of the second plurality of projections is substantially equivalent to the pattern of the inverse master substrate.

18. The method of claim 17, further comprising:

forming a second high-refractive index material on a top surface of the second inverse daughter substrate;

positioning a second glass layer on a top surface of the second high-refractive index material; and removing the second inverse daughter substrate from the second high refractive index material to form a second wave guide.

19. The method of claim 1, wherein the high-refractive index material comprises molybdenum oxide, titanium oxide, or silicon oxynitride.

20. The method of claim 18, wherein the second high-refractive index material comprises molybdenum oxide, titanium oxide, or silicon oxynitride.

* * * * *